(12) United States Patent
Keller et al.

(10) Patent No.: US 6,227,840 B1
(45) Date of Patent: May 8, 2001

(54) APPARATUS FOR MOLDING RELATIVELY LARGE ARTICLES

(75) Inventors: Frederick P. Keller, Grand Rapids; John E. Misner, Grandville; Dan Fild, Ada, all of MI (US)

(73) Assignee: Cascade Engineering, Inc., Grand Rapids, MI (US)

( * ) Notice: Subject to any disclaimer, the term of this patent is extended or adjusted under 35 U.S.C. 154(b) by 0 days.

(21) Appl. No.: 09/393,453

(22) Filed: Sep. 10, 1999

Related U.S. Application Data

(62) Division of application No. 08/914,684, filed on Aug. 19, 1997, now Pat. No. 6,063,315.
(60) Provisional application No. 60/040,339, filed on Mar. 7, 1997.

(51) Int. Cl.$^7$ .................................................. B29C 45/76
(52) U.S. Cl. ............................................ 425/147; 425/562
(58) Field of Search .................................. 425/145, 147, 425/149, 130, 573, 562; 264/40.1, 40.2, 328.8, 328.12, 572

(56) References Cited

U.S. PATENT DOCUMENTS

| | | | |
|---|---|---|---|
| 3,873,656 | * | 3/1975 | Garner ................................. 264/55 |
| 5,141,696 | * | 8/1992 | Osuna-Diaz ...................... 264/297.2 |
| 5,162,092 | | 11/1992 | Klobucar et al. . |
| 5,401,459 | | 3/1995 | Nichols et al. . |
| 5,556,582 | * | 9/1996 | Kazmer ............................. 264/40.1 |
| 6,099,767 | * | 8/2000 | Tarr et al. .......................... 264/40.1 |

FOREIGN PATENT DOCUMENTS

| | | |
|---|---|---|
| 0 042 174 | 1/1982 | (EP) . |
| 0 322 285 | * 6/1989 | (EP) . |
| 0 530 731 A1 | 12/1994 | (EP) . |
| 0 704 290 | * 4/1996 | (EP) . |
| 2 702 990 | 9/1994 | (FR) . |
| 3-286814 | * 12/1991 | (JP) . |
| WO 94/14603 | 4/1997 | (WO) . |
| WO 97/14602 | 4/1997 | (WO) . |

OTHER PUBLICATIONS

Michaeli et al., "Kaskadenspritzgiessen Analysiert und mit Cadmould Berechnet", Plastverabeiter, vol. 45, No. 11, Nov. 1994, pp. 96–102.

Ken C. Rusch, "Gas Assisted Injection Molding—the New Thermoplastic Molding Technology for exterior Body Panels", Soc. of Automotive Engineers, Inc., Feb. 1989, pp. 155–162.

"A Practical Road to Lightweight Cars," by Frank R. Field III and Joel P. Clark, dated Dec. 7, 1996, document printed from the Technology Review Homepage.

"FA Programs Combine Sequential Molding with Gas Assist Molding," author unknown, date unknown, Plastics & Computer Inc. publication.*

Gauler Kurt, "Bindennahte von Spritzgiessteilen Beseitigen", Plastverarbeiter, vol. 37, No. 10, Oct. 1986, pp. 226–228.*

* cited by examiner

*Primary Examiner*—Harold Pyon
*Assistant Examiner*—Emmanuel S. Luk
(74) *Attorney, Agent, or Firm*—Rader, Fishman, Grauer & Mc Garry, an Office of Rader, Fishman & Grauer PLLC

(57) ABSTRACT

Molding of relatively large articles such as automobile body parts by gas-assisted injection molding with sequential gating of injected thermoplastic resin into the mold cavity. Elongated ribs in the parts form gas channels and strengthening ribs for the parts. Structural parts are made by adhesively joining two such parts made by gas-assisted injection molding through a combination of hollow ribs and joining flanges at sides of the parts.

17 Claims, 7 Drawing Sheets

APPARATUS FOR MOLDING RELATIVELY LARGE ARTICLES

This application is a divisional of U.S. patent application Ser. No. 08/914,684 filed Aug. 19, 1997, now U.S. Pat. No. 6,063,315 on May, 16, 2000, which claims the benefit of U.S. Provisional patent application Ser. No. 60/040,339, filed Mar. 7, 1997.

This invention relates to injection molding. In one of its aspects, the invention relates to injection molding of relatively large panels. In another of its aspects, the invention relates to injection-molded articles with integral strengthening ribs and a good surface finish.

In yet another of its aspects, the invention relates to an apparatus for injection molding relatively large articles with integral hollow support ribs and a good surface finish.

BACKGROUND OF THE INVENTION

Relatively large articles such as automobile parts and curbside refuse collection carts have been integrally molded with injection molding and rotational molding processes. Attempts are presently being made to make larger and larger molded plastic parts in the transportation industry. Plastic parts have the advantage of light weight, corrosion resistance and lower cost.

Thermosetting polyester filled with chopped fibers have been compression molded into relatively large sheets or panels. The surface finish is not particularly good. Decorative panels are typically painted.

Resin transfer molding (RTM) has been used to make some external body parts. A glass or graphite preform is positioned in a mold and a liquid thermosetting resin is injected into the mold. The thermosetting resin solidifies and forms the body of the part. These parts typically need a structural support and have a relatively poor surface finish. However, these parts have traditionally been painted because the surface finish has not been satisfactory enough for use without painting.

The resin transfer molded parts are not recyclable in that the thermosetting resins cannot be remelted and reused. Thus, reject parts must be scrapped and sent to the landfill. This scrapping of reject parts increases the ultimate cost of the acceptable parts. Even for those parts which are satisfactory, the parts must be sent to the landfill when the vehicle is scrapped or when they are damaged.

Vehicle manufacturers are designing more and more parts with ultimate disposal in mind. Thus, it is becoming more and more important to design automotive bodies with materials which can be recycled. According, thermosetting materials are not particularly desirable.

Thermoplastic resins with glass fibers have been extruded in sheet form. Glass fibers have also been used as a laminate in thermoplastic resin sheet form. The sheets are then compression molded to a particular shape. These parts are recyclable in that the thermoplastics can be comminuted and recycled. Compression molding has limitations with respect to certain shapes. For example, compression molded parts cannot be drawn very deeply and thus must be of relatively shallow configuration. Further, any holes in the sheet are required to be made with a secondary operation, thus adding cost to the finished product. Further, the parts are not particularly strong and require structural reinforcements to be used in a vehicle body, for example. Further, the surface finish is not particularly good.

Injection molding of thermoplastic resin has been used for many small articles. Larger articles require a larger clamping tonnage for the mold halves due to the pressure with which the thermoplastic resin is injected and forced to the limits of the mold cavities. Some large articles have been made but the parts themselves are not particularly structural. For example, curbside refuse carts in 96-gallon size have been injection molded in relatively large presses. However, these carts do not have close tolerance requirements. Further, fenders and doors have been made in an injection-molding process. The fenders and doors, however, are not load bearing and have little structural integrity. These panels must be attached to the frame of the car body. Further, the outer surfaces are always painted because of surface flaws where external surface finish is important. In one instance, a bumper fascia has been made by injection molding and not painted. The bumper fascia was not structural.

The injection molding of larger articles requires multiple drops (gates). Typically, all gates open simultaneously. The use of multiple gates typically produces multiple knit lines. When parts exceed five feet in any one dimension, the problem is exacerbated.

It has been proposed to make automotive bodies by molding portions of the frame and skin from plastic and joining the frame and skin together by bonding. These parts are generally dish-shaped and nest within each other. There are difficulties in forming the bonding surfaces without adding significant weight or without expensive mold designs.

Another problem with injection molding larger articles is that the size of the articles is limited by clamping tonnage. The larger the projected area of the article, the greater the clamping tonnage. Machines which have very large clamping tonnage are very expensive and difficult to house. Extremely large clamping tonnage injection molding machines are extremely rare because of high cost.

Still another problem with injection molding of large articles is distortion due to uneven densities of the thermoplastic material throughout the articles. When higher molding pressures are used, thermoplastic resin near a gate will tend to pack more densely than the resin near the ends of the mold cavity. As a result, a large injection-molded article will sometimes warp due to uneven density of packing of the thermoplastic material. In parts in which fit and finish are important, i.e., low dimensional tolerances, warping and packing is unacceptable. When material has high fiber content or filler, orientation can be a serious problem.

Klobucar et al. in U.S. Pat. No. 5,162,092 disclose a process for injection molding a thermoplastic backing or other synthetic resin to a carpet layer by suspending the carpet layer in a mold cavity, injecting thermoplastic resin into the mold cavity and injecting an inert fluid, such as nitrogen, into the mold at a relatively low pressure to assist in distributing the thermoplastic resin throughout all points in the mold.

According to the invention, an apparatus for molding a relatively large article comprises a pair of mold halves defining a mold cavity therebetween and at least first and second injection conduits, spaced from each other, in one of the mold halves for injecting molten thermoplastic resin into the mold cavity. Injection valves or gates are provided in the first and second injection conduits to control the flow of molten thermoplastic resin into the mold cavity. A controller is programmed to control the first and second injection valves to initially open the first valve and close the second valve during an initial time period in the injection cycle. The controller is programmed to open the second valve about the time when the molten thermoplastic resin arrives at the second injection conduit through the mold cavity from the first injection conduit. Further, a gas-injection conduit with a gas control valve is provided in one of the mold halves for injecting an inert gas into the mold cavity, preferably in a rib cavity. The controller is programmed to control the gas control valve to control the injection of inert gas into the mold cavity to force the molten thermoplastic resin to the edges of the mold cavity, preferably about the time the flow of molten thermoplastic resin to the mold cavity is discontinued. The controller is further programmed to discontinue the flow of molten thermoplastic material into the mold cavity through the first injection conduit at about the time the injection of molten thermoplastic material into the mold cavity through the second injection conduit is commenced.

The mold cavity preferably comprises an elongated rib cavity. The first and second injection conduits and the gas-injection conduit terminate in the rib cavity. The injection of gas into the rib cavity hollows out the rib and packs the thermoplastic resin at the sides of the rib cavity to enhance the strength and rigidity of a molded rib in the resulting article.

In a preferred embodiment of the invention, the one mold half has a third injection conduit spaced from the first and second injection conduits and has a third injection valve or gate to control the flow of thermoplastic resin therethrough. The controller is programmed to open the third injection valve or gate substantially simultaneously with the arrival of the molten thermoplastic resin from the first or second injection conduit at the third injection conduit and is programmed to close the second injection valve to discontinue the flow of molten thermoplastic resin to the second injection conduit.

In one embodiment of the invention, at least one of the first and second mold halves has pressure sensors to detect the pressure of thermoplastic resin at several locations in the mold cavity. The pressure sensors are operably connected to the controller to provide inputs to the controller as to the arrival of the molten thermoplastic resin at least at the second and third injection conduits.

DESCRIPTION OF THE DRAWINGS

The invention will now be described with reference to the accompanying drawings in which.

DESCRIPTION OF THE PREFERRED EMBODIMENTS

Figure 1:
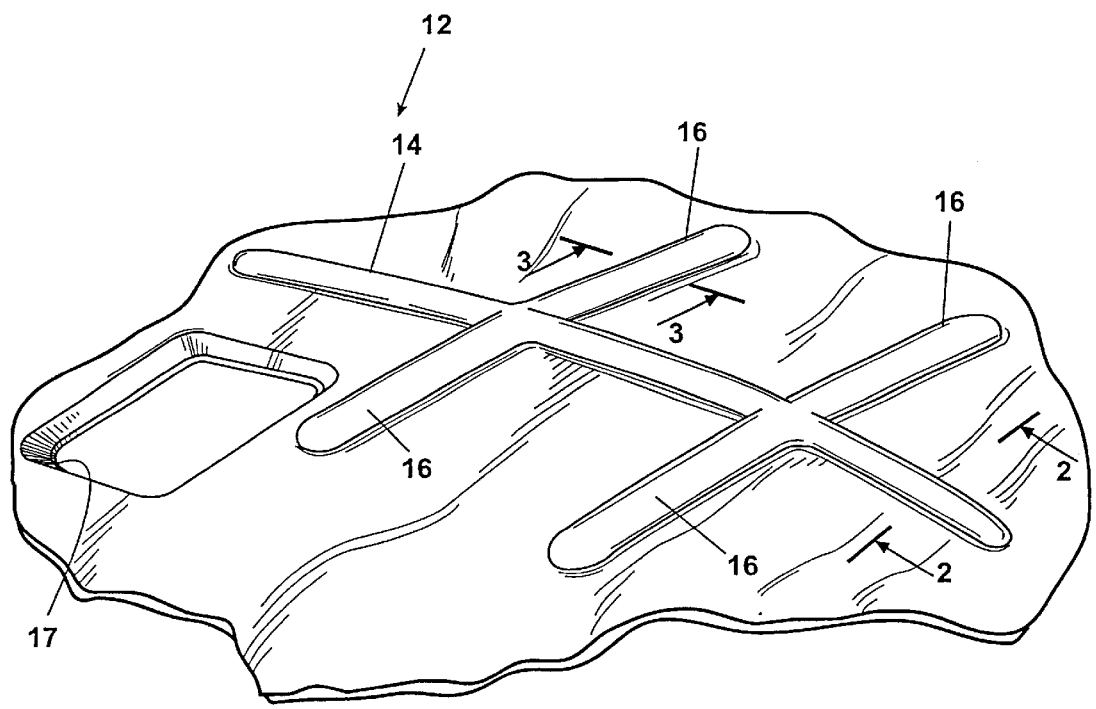
FIG. 1 is a perspective view of a large molding according to the invention.
Figure 2:
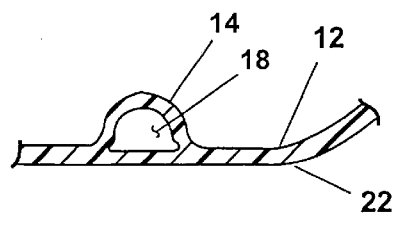
FIG. 2 is a partial sectional view taken along lines 2—2 of FIG. 1.
Figure 3:
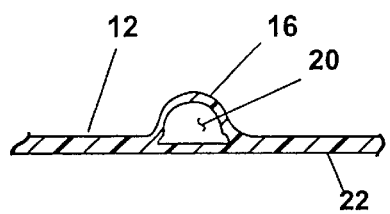
FIG. 3 is a partial sectional view taken along lines 3—3 of FIG. 2.

Referring to the drawings and to FIGS. 1–3 in particular, there is shown a large molded article 12 having a central rib 14 and branch ribs 16. An opening 17 is formed in the article 12. As illustrated in FIG. 2, the rib 14 has a hollow channel 18. As illustrated in FIG. 3, the branch ribs 16 have a hollow channel 20.

The article 12 is relatively large and has a finished Class A surface 22 opposite the surface containing the ribs 14 and 16. The surface 22 is molded with finish quality and can be used in unpainted condition for large parts, for example, automotive parts such as fenders, doors and other external body parts. The article 12 is relatively thin in cross section but the ribs 14 and 16 provide structural support for the article 12. Thus, the article 12 is self-supporting due in part to the structural nature of the ribs 14 and 16 and can be mounted through structural flanges (not shown) to the supporting frame of a vehicle, for example.

Figure 4:
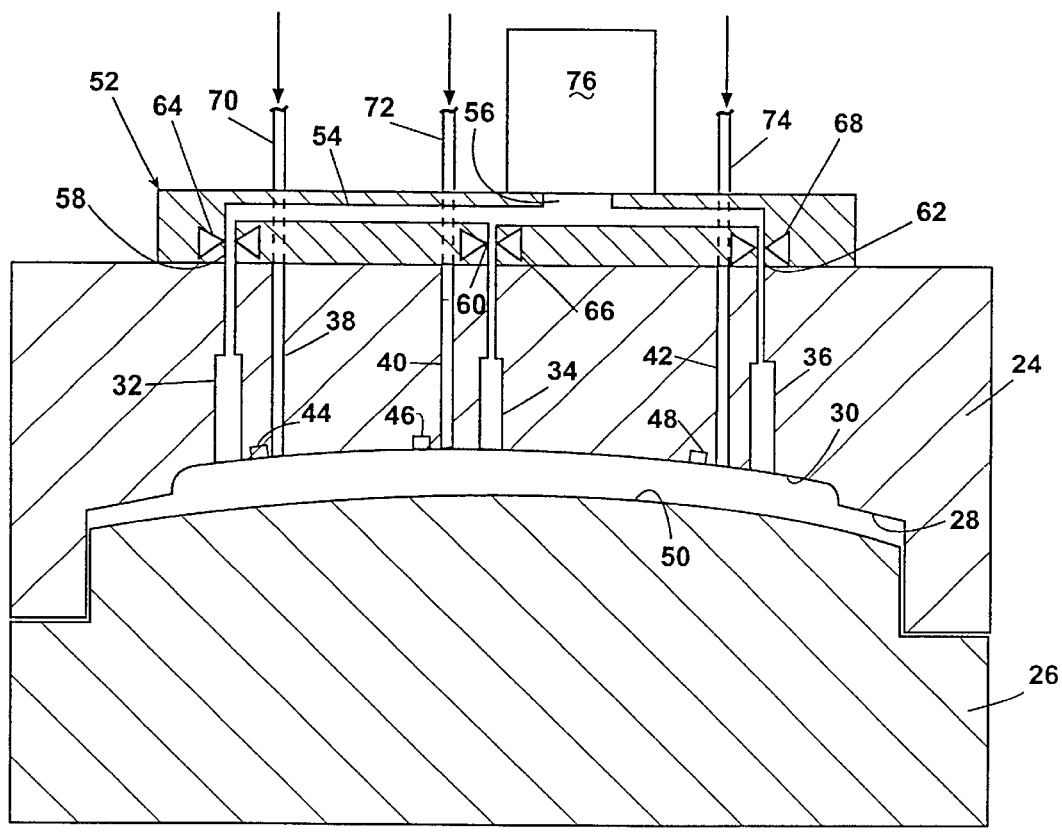
FIG. 4 is a sectional view of a mold for making the molding illustrated in FIGS. 1–3.

The article 12 is made in a mold illustrated in FIG. 4 to which reference is now made. A mold has mold halves 24 and 26 which form a mold cavity with cavity surfaces 24 and 50, respectively. A rib cavity surface 30 which, for example, forms the central rib 14 or a branch rib 16 is provided in the cavity 28. Typically, multiple rib cavities are formed in the mold surface 24. First, second and third drop (injection) conduits 32, 34 and 36, respectively, are formed between the exterior of the mold half 24 and the rib cavity surface 30 and terminate in the first, second and third spacer locations in the rib cavity. First, second and third air-injection conduits 38, 40 and 42 are formed between the exterior surface of the mold half 24 and the rib cavity 30. First, second and third pressure sensors 40, 46 and 48, respectively, are mounted in the mold half 24 at the surface of the rib cavity 30 and are connected by wires (not shown) to a controller. Temperature sensors (not shown) can also be provided in the mold adjacent the cavity 28 to measure the temperature of the mold cavity.

A manifold 52 is mounted on top of the mold half 24 and has an interior distribution channel 54 coupled at one end to an injection port 56 and to first, second and third delivery ports 58, 60 and 62, respectively. A first gate valve 64 is mounted in the first delivery port 58. A second gate valve 66 is mounted in the second delivery port 60. A third gate valve 68 is mounted in the third delivery port 62.

First, second and third gas supply conduits 70, 72 and 74 are connected respectively to the first, second and third air-injection conduits 38, 40 and 42 for delivery of pressurized gas to the rib cavity 30. An extruder 76 is coupled to the manifold 52 to deliver on demand fluid thermoplastic resin at an elevated temperature. The extruder 76 can be any conventional thermoplastic extruder capable of heating thermoplastic pellets and extruding molten thermoplastic resin at elevated temperatures and pressures. Examples of thermoplastic resins include high-density polyethylene, polypropylene, thermoplastic polyester, polycarbonates, acrylics, blends and alloys thereof. Typically, the temperature of the thermoplastic resin will be dependent on the processing temperature of the materials. The pressure of the thermoplastic resin during extrusion will be dependent on the materials and the nature of the molded articles.

Figure 5:
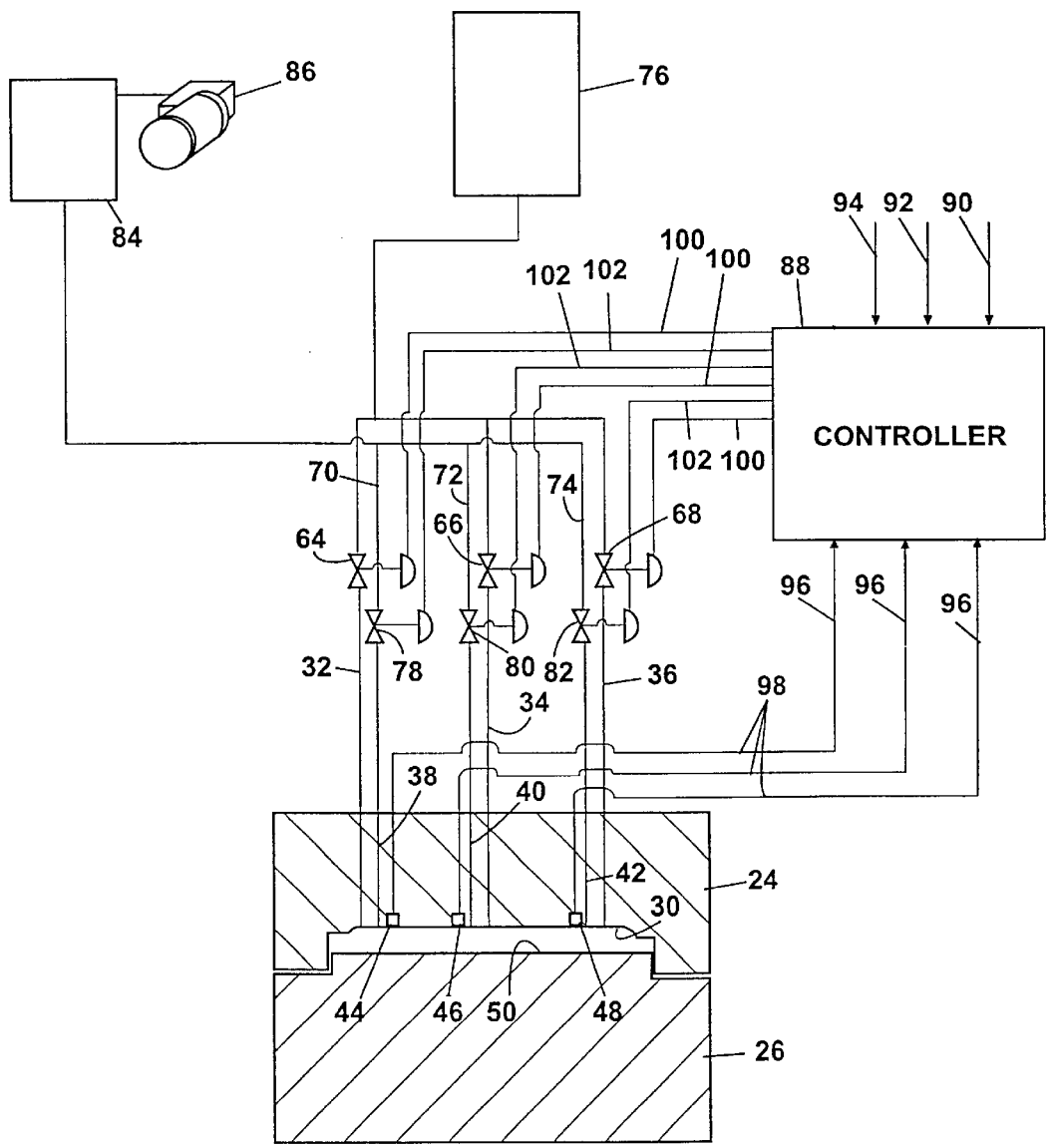
FIG. 5 is a schematic diagrammatic representation of a control system for use in molding articles according to the invention.

Referring now to FIG. 5 which is a schematic representation of the control system of the invention, where like numerals have been used to designate like parts. Injection conduits 32, 34 and 36 each have a gate valve 64, 66 and 68, respectively, which are connected to a controller 88 through control lines 100. Each of the pressure sensors 44, 46 and 48 are connected to the controller 88 through control lines 98 and provides inputs 96 to the controller 98. The controller also has other inputs 90, 92 and 94 at which other set points are installed into the controller. The first, second and third gas supply conduits 70, 72 and 74 are connected to an inert gas supply source 84 which is supplied with an inert gas source under pressure, for example, from a compressor or from an inert gas tank. The first, second and third gas supply conduits 70, 72 and 74 have, respectively, a first gas control valve 78, a second gas control valve 80 and a third gas control valve 82. These gas control valves are connected to the controller through control lines 102.

The controller is programmed to open the first gate valve 64 when the second gate valve 66 and the third gate valve 68 are closed to inject molten thermoplastic resin into the mold cavity through the first drop or injection conduit 32. The controller 88 is further programmed to open the second gate valve 66 at a time substantially simultaneous with the arrival of molten thermoplastic resin through the mold cavity from the first drop conduit 32 and to thereafter close the first gate valve 64. The controller is preferably programmed to close the first gate valve 64 substantially simultaneously with the opening of the second gate valve 66. The arrival of the molten thermoplastic resin through the mold cavity at the second drop or injection conduit 34 can be sensed by the second pressure sensor 46.

The controller 88 is further programmed to open the third gate valve 68 substantially simultaneously with the arrival of molten thermoplastic resin through the cavity from the first or second drop conduits 32 and 34. The presence of the molten thermnoplastic resin at the third drop conduit 36 can be detected by pressure sensor 48 and applied as an input through one of the input ports 96 to the controller 88. The controller 88 is further programmed to close the second gate valve 66.

The controller 88 is further programmed to close the gate valve 68 after a predetermined time interval and to open the gas control valves 78, 80 and 82 to inject gas under pressure through the third gas-injection conduit 42 into the mold cavity to assist in distributing the molten thermoplastic material to the corners of the mold.

The controller 88 is further programmed to close the gas control valves 78, 80 and 82 after the molded article has cooled at least to a solid state and preferably to a stable state. The controller further can be programmed to open the mold after a predetermined cooling period whereupon the molded article can be removed from the mold cavity.

Figure 6:
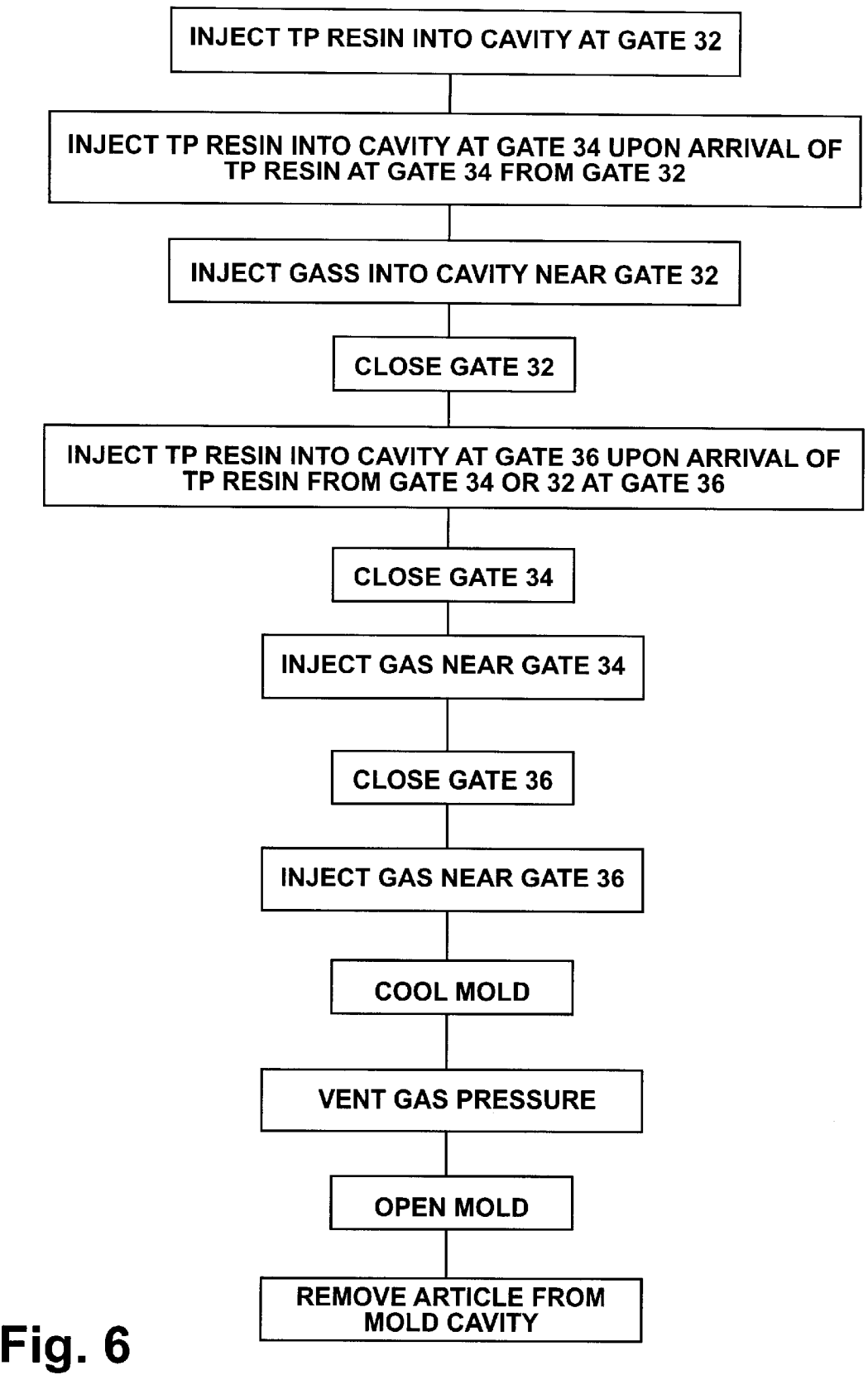
FIG. 6 is a flow chart illustrating a process according to the invention.

The operation of the mold illustrated in FIG. 4 to make the article 12 illustrated in FIGS. 1–3 will now be described with references to FIGS. 4, 5 and 6. The mold halves 24 and 26 are closed and clamped together through a substantial clamping force with conventional clamps (not shown). Molten thermoplastic resin under high pressure is extruded from an extruder 76 into the distribution channel 54. The first gate valve 64 is opened by the controller 88 and molten thermoplastic resin is forced through the first delivery port 58 and through the first drop or injection conduit 32 into one location of the mold cavity. As the molten thermoplastic resin enters the mold cavity, it will be begin flowing in a radial direction from the first drop conduit 32. Typically, the molten material will fill the corners and pockets around the first drop conduit and flow towards the second drop conduit 34. As the molten thermoplastic resin flows in the mold cavity, it is cooled at the mold cavity surface and begins to freeze along the interface of the mold cavity and the molten thermoplastic resin. The center of the molten thermoplastic resin, however, remains molten and is pushed away from the first drop conduit 32.

The pressure in the rib cavity 30 is detected by the first, second and third pressure sensors 44, 46 and 48 which relay control signals to the controller 88 through control lines 98 and inputs 96. When the molten thermoplastic resin reaches the second drop conduit 34, the pressure detected by the second pressure sensor 46 will increase, thereby indicating the presence of the molten material at the second drop conduit 34. At this time, the controller closes the first gate valve 64 and opens the second gate valve 66 so that molten thermoplastic resin flows through the second drop conduit 34 to a second location in the mold cavity.

The molten thermoplastic resin which flows through the second drop conduit 34 will flow to the extent possible radially outwardly from the second drop conduit 34 in the cavity 28 and 50 and along the rib cavity. The presence of the molten thermoplastic material at the third drop conduit 36 will be detected by the third pressure sensor 48. A control signal will be transmitted to the controller 88 from the third pressure sensor 48 through one of the control lines 98. When the molten thermoplastic material reaches the third drop conduit 36, the second gate valve 66 is closed by the controller 88 and a third gate valve 68 is opened by the controller 88.

After the molten thermoplastic resin has been injected into the mold cavity through the third drop conduit 36 for a predetermined period of time or, alternatively, until the pressure detected by the third pressure sensor 48 reaches a predetermined value, the controller will open the gas control valves 78, 80 and 82 and pressurized gas is supplied through the gas supply conduits 70, 72 and 74 to the gas injection conduits 38, 40 and 42 and into the mold cavity at the rib cavity surface 30. Pressurized gas entering the mold cavity through the gas-injection conduits 38, 40 and 42 forces the molten thermoplastic resin along the rib cavity to form a hollow channel therein and forces the thermoplastic resin to the ends of the mold cavity. At or before the time that the gas is injected into the mold cavity through the gas-injection conduits 38, 40 and 42, the controller 88 closes the third gate valve 68. The pressure in the first, second and third gas-injection conduits 38, 40 and 42, respectively, is maintained until such time as the molded article is adequately cooled. The controller then closes the first, second and third gas control valves 78, 80 and 82. The gas pressure in the mold cavity is then vented and the mold cavity is opened. The molded article can then be removed from the mold cavity. The gas pressure in the first, second and third gas-injection conduits 38, 40 and 42 is maintained in the mold cavity until such time as the thermoplastic resin has solidified and the part is substantially cooled beyond the point at which shrinkage will occur.

The molding process takes place by sequential introduction of thermoplastic resin. The sequencing of the gate operation can be monitored with pressure detectors 44, 46 and 48 or can be controlled through a timing program which opens the gates in a predetermined sequence which approximates the arrival of the molten thermoplastic resin at a downstream injection port. The sequencing of the gates for the molten thermoplastic resin provides a continuous flow of resin throughout the mold without interfacing of two or more wave fronts of molten thermoplastic resin. Thus, the surface formed in the mold cavity is smooth and free of knit lines.

Further, because the material flows sequentially from one gate to the next, excessive pressure and "packing" of the thermoplastic resin in the article is minimized. The molded articles are relatively free from warpage as well as from surface blemishes. The use of gas injection provides a vehicle for molding larger articles with a given tonnage because of the distribution of the thermoplastic resin to the ends of the mold cavity with the pressurized gas rather than solely through increased molding pressure of the extruder.

The invention has been described with respect to FIGS. 1–6 in a relatively simple manner to illustrate the invention. Although only three sequentially operated injection gates or drop conduits have been shown and described for purposes of simplicity, typically, sets of multiple gates are operated in sequence using the same principles discussed above to make large and complex articles. Two or more sets of gates can be used to make the larger articles. There may be as many as ten sets of multiple gates which are operated sequentially to form the large article.

Figure 7:
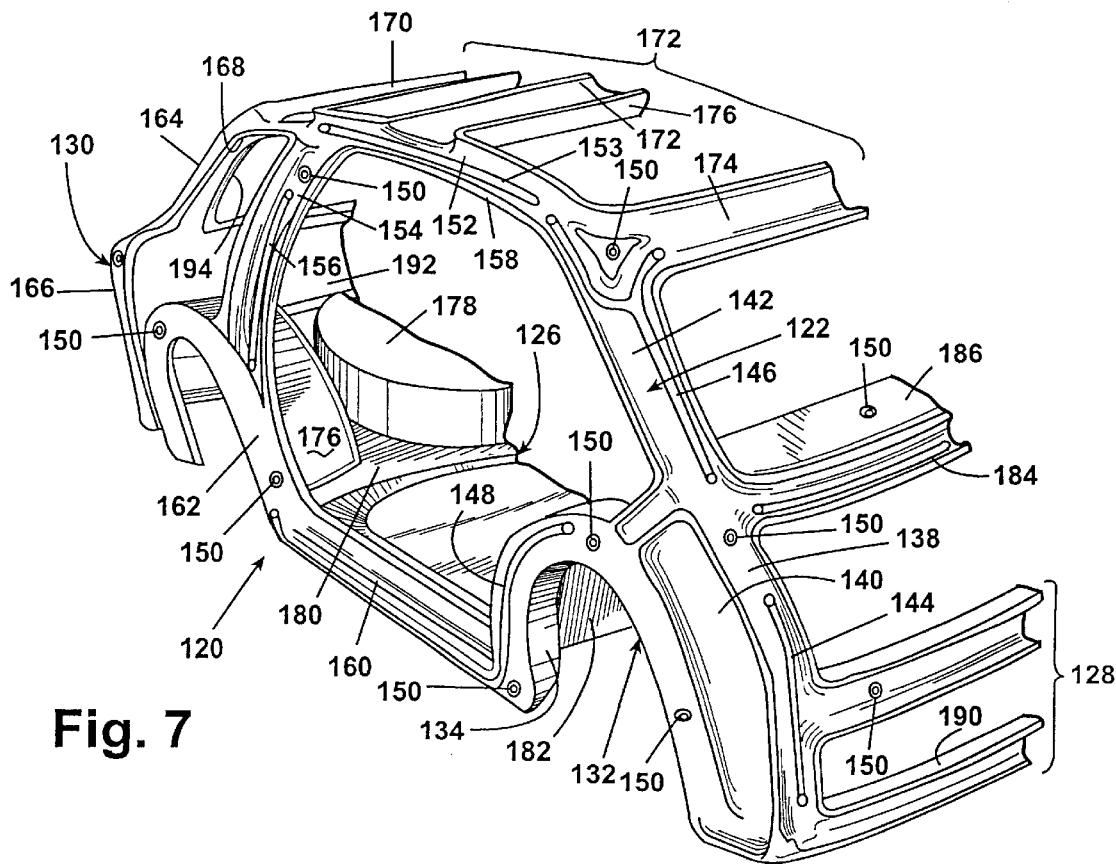
FIG. 7 is a perspective view of an automotive body part manufactured by a process according to the invention.

Referring now to FIG. 7, there is shown a relatively large automotive structural body frame 120 of a dish-shaped configuration integrally molded in one piece by a process and apparatus according to the invention. The structural body frame 120 has a side portion 122, a top portion 124, a bottom portion 126, a front portion 128 and a back portion 130. These portions are integrally molded together in one piece and form one-half of a structural body frame.

The side portion 122 comprises a fender frame 132 having an inner side panel 134 defining a wheel well opening and a wheel well panel 136. A front frame member 138 extends upwardly from a front portion of the frame 120 and joins an A pillar frame member 142. A connecting panel 140 extends between the front frame member 138 and the wheel well panel 136. A rib 144 is formed in the front frame member 138. The rib 144 is hollow and has a cross-sectional configuration, for example, as illustrated in FIGS. 2 and 3. A hollow rib 146 of similar nature is formed in the A pillar frame member 142. A rib 148 of similar configuration to the rib 144 is formed in the wheel well panel 136. Apertures 150 are formed in each of the frame portions at strategic locations.

A side roof frame element 152 extends rearwardly from the upper portion of the A pillar frame member 142 and to a C pillar 164 at the rear portion of the body frame 120. A hollow rib 153 extends along the side roof frame element 152 and has a configuration similar to the ribs illustrated at FIGS. 2 and 3. A B pillar frame element 154 extends downwardly from the side roof frame element 152 to a rear fender frame 162. A hollow rib 156 of the type illustrated in FIGS. 2 and 3 is formed in the B pillar 154. A side bottom frame 160 having a rear portion of the hollow rib 148 extends between the front wheel well panel 136 and the rear fender frame 162. C or rear pillar 164 extends between the side roof frame element 152 and a side rear frame element 166. Hollow ribs of the type illustrated in FIGS. 2 and 3 are also formed in the C or rear pillar 164 and in the side rear frame element 166. A door opening 158 is defined by the front wheel well panel 136, the A pillar frame element 142, the side roof element 152, the B pillar 154, a front portion of the rear wheel frame 162 and the side bottom frame element 160. An opening 168 is formed by a rear portion of the side roof frame element 152, the C or rear pillar 164, an upper portion of the side rear frame element 166 and an upper portion of the rear wheel frame 162.

The top portion 124 of the frame comprises U-shaped roof frame members 170, 172 and 174, all of which extend laterally from the side roof frame element 152. Each of these roof frame members 170, 172, and 174 have a hollow rib of the same nature illustrated in FIGS. 2 and 3.

The bottom portion 126 of the body frame 120 has a spare tire wheel well 178, a floor portion 180, a rear fender well 176 and a front wheel well 182. The front portion 128 of the body frame 120 is formed by a U-shaped frame member 184 having a front deck panel 186 and U-shaped frame member 188 and 190. The U-shaped frame members 184, 188 and 190 extend laterally from the front frame member 138.

The back portion 130 of the body frame 120 has a rear panel 192 and a rear window opening 194.

The body frame 120 forms a half of a structural frame for a vehicle. This very large part is molded by a process and apparatus according to the invention. A mirror image frame (not shown) part can also be formed according to the invention and joined to the body frame 120 illustrated in FIG. 7 to form a complete vehicle body frame.

Figure 8:
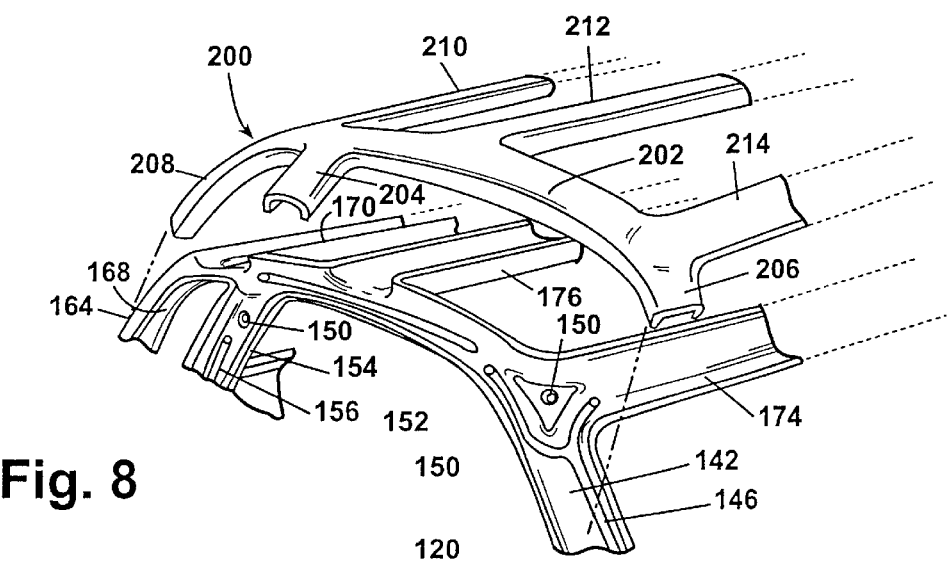
FIG. 8 is a partial view of the body part illustrated in FIG. 7 and an additional cover body part also manufactured according to a process according to the invention.

Referring now to FIG. 8 where like numerals have been used for like parts, there is shown a structural cover panel 200 formed in a dish shape by a U-shaped side frame 202 having U-shaped B pillar element 204, U-shaped A pillar element 206 and U-shaped C pillar element 208. U-shaped roof frame elements 210, 212 and 214 extend laterally from the U-shaped side roof frame 202. The dish-shaped body frame 120 nests within the cover panel 200.

The structural cover panel is made in accordance with a process and apparatus according to the invention. The external surface of the cover panel 200 has a very fine finish and may not need to be painted or otherwise finished. Further, each of the U-shaped frame elements which comprise the cover panel 200 have an internal hollow rib of the same nature as, for example, ribs 144 and 146 illustrated in FIG. 7. Further, the interior of the cover panel 120 is provided with a series of sockets (not shown) which project downwardly from an interior surface of the panel toward the structural body frame 120. These sockets are in registry with the apertures 150 and receive fasteners (not shown) which extend through the apertures 150 from beneath the body frame 120 and are secured in the sockets in the cover panel 200 to rigidly secure the cover panel 200 to the structural body frame 120. One or more structural cover panels are mounted to the body frame 120 in similar fashion to provide a structural finished external surface for the body frame. Each of the cover panel 200 and the body frame are structural in nature. They are rigidified by the ribs 144, 146, 148, 153, etc. which are hollow to reduce the weight without appreciably reducing the rigidity. The cover panel 200 and the body frame 120 can be bonded together with adhesives or chemically bonded together as well as or in lieu of mechanical fasteners. The combination of the cover panel 200 and the body frame 120 forms a rigid structural frame which has a clear exterior finish which need not be painted or otherwise finished. The ribs form runners for the plastic and yet form a part of the final structure. The two body parts, when secured together, have significant bending and torsional rigidity without any metal parts. Although the runners add some weight to the part, the part is still light in weight because of the hollow channels within the runners.

Preferably, the two body parts have walls which, when joined together, form structural rigid passageways which preferably are interconnected to form a rigid spine for the assembled body parts. The rigid channels are formed at least in part by the hollow ribs which further form bonding surfaces for bonding the parts together in a manner described below with reference to FIGS. 9–12. The resulting body parts have a high strength-to-weight ratio, yet have a superior exterior surface finish.

The parts have significant structural integrity and have a fit and finish which enables the parts to be mated together for bonding without distortion. The low tolerances to which the parts are made is achieved by sequential gating and the gas-assisted injection molding of the ribs.

Figure 9:
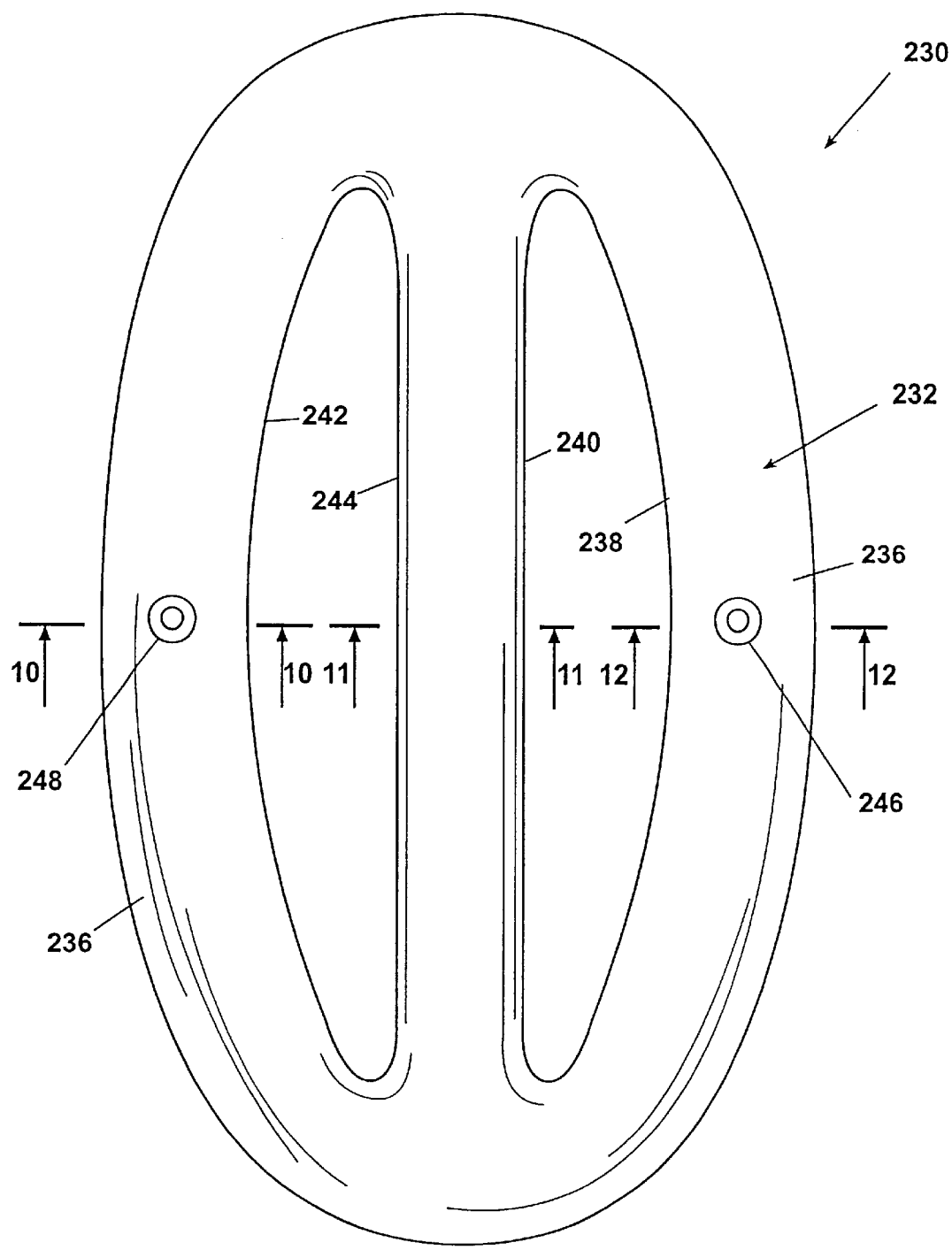
FIG. 9 is a plan view of an article made in accordance with the invention.

Referring now to FIG. 9, there is shown a plan view of an article 230 made in accordance with a process according to the invention. The article 230 has an upper shell 232 and a lower shell 234. The upper shell 232 has an outer rim 236 and a curved inner rim 238 coupled to a straight inner rim 240. The upper shell 232 further has a curved inner rim 242 which is coupled with a straight inner rim 244 to define an interior opening. An interior opening is also formed between the curved inner rim 238 and the straight inner rim 240. Fastener openings 246 and 248 are formed in the upper shell for fasteners.

Figure 10:
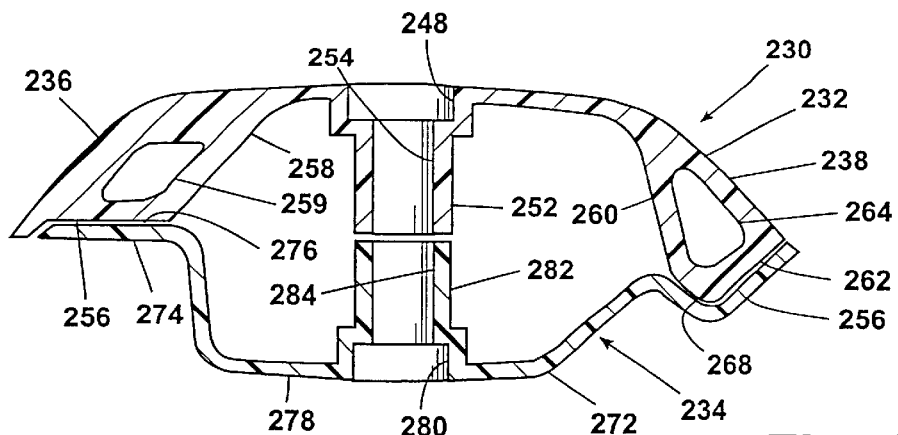
FIG. 10 is a sectional view taken along lines 10—10 of FIG. 9.

Referring now to FIG. 10, the upper shell 232 has a depending tube 252 aligned with the fastener openings 248 and cylindrical opening 254 therethrough. The outer rim 236 is formed as a rib having a lower bonding surface 256, an inner surface 258 and a hollow gas channel 259. In like manner, the curved inner rim 238 is formed as a rib having an inner surface 260, a lower bonding surface 262 and a hollow gas channel 264.

The lower shell 234 has an outer L-shaped flange 266 forming an inner L-shaped bonding surface 268 and a web 272. An outer flange 274 has an upper bonding surface 276 connected to the web 272 through an L-shaped web 278. A bolt opening 280 is formed between the webs 272 and 278. A tubular extension 282 having an inner cylindrical surface 284 is aligned with the bolt opening 280.

The upper shell 232 and the lower shell 234 are typically bonded together through a suitable adhesive at the bonding surfaces 262 and 268 on one side and the bonding surfaces 256 and 276 at the other side. A bolt (not shown) can extend through the bolt openings 248 and 280 to also secure the upper and lower shells 232 and 234 together. As illustrated in FIG. 10, a rigid article having a hollow passageway is formed by bonding together the upper shell 232 and the lower shell 234, with the walls forming the passageway being rigidified through the ribs formed by the outer rim 236 and the inner rim 238. The ribs further define bonding surfaces through which the shells can be bonded together. The weight of the rim is significantly reduced and the cost of the resin is significantly reduced by the hollow gas channels 259 and 264. The gas channels are formed by gas assist in the injection-molding process in the manner described above. As illustrated in FIG. 10, the two hollow ribs are positioned diametrically opposite one another across the hollow passageway defined by the walls of the upper and lower shells 32 and 34.

Figure 11:
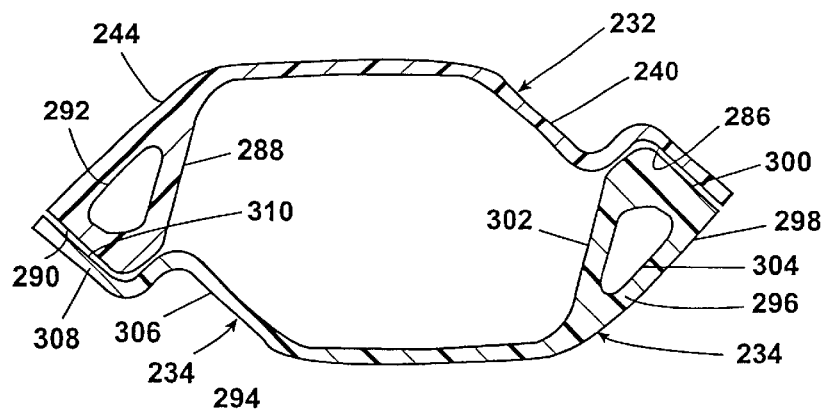
FIG. 11 is a sectional view taken along lines 11—11 of FIG. 9.

FIG. 11 illustrates a variation in the shell structures described above with reference to FIG. 10. Turning now to FIG. 11, the straight inner rim 244 is formed as a rib defined by an inner surface 288, a lower bonding surface 290 and a hollow gas channel 292. On the other hand, the straight inner rim 240 is of relatively uniform thickness in cross-sectional area and forms a bonding surface 286.

The lower shell 234 includes a central web 294 connected to a rib 296 defined by an outer surface 298, an upper bonding surface 300 and an inner surface 302. A hollow gas channel 304 is formed in the rib 296. The central web 294 is connected to an outer flange 308 through a connecting web 306. The outer flange 308 forms an upper bonding surface 310 and is relatively uniform in cross-sectional thickness.

The upper shell 232 and the lower shell 234 are secured together through adhesives at the bonding surfaces 286 and 300 at one side and the bonding surfaces 290 and 310 at the other side of the cross-sectional shape illustrated in FIG. 11. Like the hollow shell assembly illustrated in FIG. 10, the configuration illustrated in FIG. 11 is a rigid hollow structure which has a high strength-to-weight ratio. The wide bonding surfaces are formed by the ribs 296 and the rib at the straight inner rim 244. The gas channels 292 and 304 reduce the weight and reduce the amount of material needed to form the shapes. The resulting structure is very rigid in nature, yet is light in weight, having a high strength-to-weight ratio.

Figure 12:
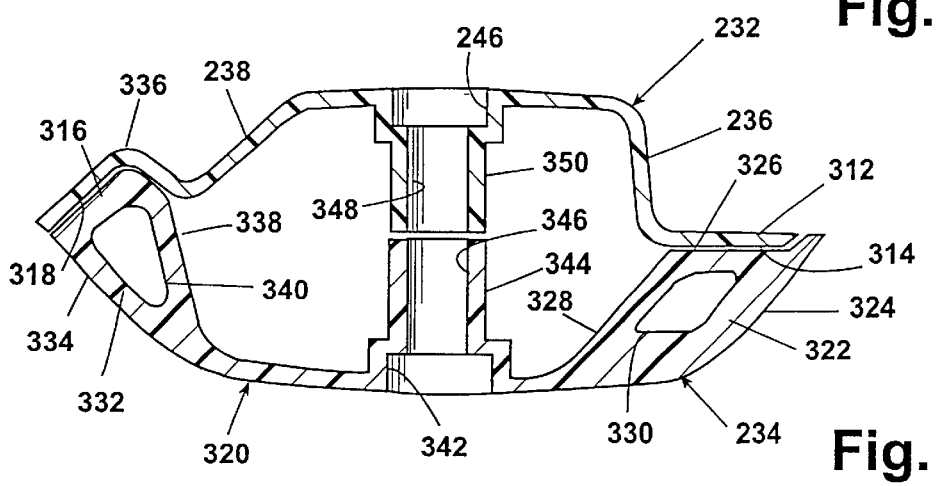
FIG. 12 is a sectional view taken along lines 12—12 of FIG. 9.

Referring now to FIG. 12, there is shown yet another configuration which is similar to the configuration shown in FIG. 10 except that the ribs are formed at the bottom shell 234 rather than on the top shell. As illustrated in FIG. 12, the upper shell 232 has an outer flange 312 of relatively uniform cross-sectional thickness and forms a lower bonding surface 314. The curved inner rim 238 is formed in relatively uniform cross section, terminating in an outer flange 316 which forms a lower bonding surface 318.

The lower shell 234 has a central web 320 which is connected to an outer rib 322 defined by an outer surface 324, an upper bonding surface 326 and an inner surface 328. A hollow gas channel 330 is formed in the rib 322.

An inner rib 332 is formed by an outer surface 334, an upper bonding surface 336 and an inner surface 338. A hollow gas channel 340 is formed in the inner rib 332. A bolt opening 342 having a tubular extension 344 with an inner cylindrical surface 346 extends inwardly in alignment with the bolt hole 246. A tubular extension 350 having an inner cylindrical surface 348 extends from the bolt hole 256. A bolt (not shown) can be positioned within the bolt hole 246 and 342 to secure the portion of the upper shell 232 to the portion of the lower shell 234 illustrated in FIG. 12. Preferably, the upper shell 232 is bonded to the lower shell 234 in part through adhesives which are positioned on the bonding surfaces 314 and 326 on one side and to bonding surfaces 336 and 318 on the other side of the structure illustrated in FIG. 12. The ribs 322 and 330 form wide bonding surfaces for the adhesive, adding strength and rigidity to the bonded assembly. The gas channels 330 and 340 reduce the amount of material and the weight of the ribs without a loss of strength or rigidity. The hollow gas channels 330 and 340 as well as the hollow channels 304 and 292 are formed during the injection-molding process with a gas assist in a manner which has been described above. Further, the use of the hollow gas channels 330, 340, etc. conveniently forms bonding surfaces while synergistically increasing the strength of the resulting structural frame. The gas channels 330, 340, etc., eliminate the need for expensive molds for forming bonding surfaces on both sides of the shell.

The inner and the outer shells made according to the invention are joined together to provide the structural integrity needed for a rigid frame. The inner and outer shells can be joined by mechanical fasteners such as screws and rivets, or by welding, such as heat welding and solvent welding, or by an adhesive bonding system. Adhesive bonding is preferred over other joining techniques. Adhesive bonding provides a continuous bond line and thus avoids stress concentration as one would have in mechanical joints. Also, adhesive bonding has gap filling capability between the inner and the outer shell which might otherwise be difficult to obtain in welding. Adhesive selection will depend on the thermoplastic resin substrate. Common adhesives includes epoxies, acrylates, and polyurethanes. The adhesives are usually thermosetting in nature and need to be cured to obtain strength. Although adhesives can cure at ambient temperatures, heat can be applied to the bond line to accelerate the curing rate. Heat can be applied in one of several ways such as hot air, infrared, microwave, induction, etc.

It is envisioned that the thermoplastic resins used to make the inner and the outer shell can be different materials. To obtain the higher impact requirement and better surface finish, the outer shell material can have less or no reinforcing material. It is preferred that, in these circumstances, the thermoplastic resin of the inner and outer shell material remain same or compatible such that joining of the shells can be accomplished with one adhesive.

The bonded assemblies illustrated in FIGS. 10–12 are made inexpensively through a gas-assist injection-molding process, with the resulting structure having a high strength-to-weight ratio, yet having a superior surface finish and being formed relatively inexpensively. Mechanical fasteners can be used where desired to join the two injection-molded parts together to form a rigid, integral article. The configuration of the hollow shell structure illustrates the type of hollow channels formed in assembled body parts according to the invention as, for example, illustrated in FIGS. 7 and 8.

Although the invention has been described with respect to sequential injection of thermoplastic into a mold, sets of multiple gates are typically opened in sequence to simultaneously distribute plastic to a number of different gates simultaneously. However, knit lines are avoided on the surface due to a configuration of sequential gating of the thermoplastic material.

The parts according to the invention are relatively large, for example, greater than eight feet in one dimension and typically have a flexural modulus of 100 psi or greater. Typically, the flexural modulus is between 120 and 200 psi.

The parts made according to the invention are relatively large but can be made with a minimal clamping tonnage because of the use of gas-assisted injection molding and sequential gating. Thus, machine cost is minimized.

The parts made according to the invention are typically isotropic, regardless of whether the thermoplastic is filled with fibers. This isotropic nature of the parts is achieved by multiple drops with sequential gating and gas-assisted injection molding. Because of the process described above, the large parts are made with a relatively uniform density. Uneven packing of the polymer is eliminated by the sequential gating as well as the gas-assisted injection molding process. Thus, the parts are structural in nature, have a very fine surface finish, have dimensional stability resulting in good fit of the parts and are essentially free of warpage. Further, the properties of the molded parts are essentially isotropic.

Nearly all types of thermoplastic resins, whether crystalline or amorphous, can be utilized to mold parts using the process described in this invention. Examples of crystalline polymers include polyolefins, polyamides, polyesters, polyaryletherketones, polyoxymethylene polymers, liquid crystal polymers, etc., and examples of amorphous polymers include polycarbonates, acrylics, polystyrenes, etc. Copolymers such as styrene-acrylonitriles and terpolymers such as acrylonitrile-styrene-acrylic and acrylonitrile-butadiene-styrene can also be used in this invention. Also, alloys and blends of various thermoplastics described above can be used in this invention. Examples of common alloys and blends include Xenoy from General Electric, which is an alloy of polycarbonate and polybutylene terephthalate, and Hivalloy from Montell USA Inc., which is an alloy of polypropylene and polystyrene. Preferred thermoplastic resins should have good flow properties for the ease of processing the large parts and adequate structural integrity dictated by the part application. In general, to obtain higher stiffness and higher heat distortion temperature, these thermoplastics will be reinforced with one or more reinforcing agents. Common reinforcing agents include fibrous materials such as glass fibers, polymeric fibers and natural fibers such as jute, and minerals such as mica and talc. A preferred reinforcing agent is glass fiber with 10–20 micron diameter and 3–4 mm in length. Longer glass fibers about 12 mm in length can also be used to further improve the properties of the thermoplastic material.

Structural frame parts as illustrated in FIGS. 7 and 8 were made according to a process and apparatus according to the invention using a Hoechst Celanese PET polymer having 15 percent weight glass fill.

The parts were manufactured in an injection molding machine with a 9000 ton clamp unit and 200 pound shot capacity (in polypropylene). The parts weighed 65 pounds and measured 100"×52"×15".

The mold used a heated manifold to convey the material from the machine to seven hydraulic actuated valve gates allowing sequencing and/or simultaneous flow. The mold measured 96"×156" and weighed 125 tons.

The polymer is a polyethylene terephthalate polymer which was molded at a temperature in the range of 520° F. to 560° F. The mold was heated in a temperature range of 200° F. to 250° F. The gate sequence 1,3,4,6,5 produced parts essentially free of distortion, with good fit characteristics and high-quality surface finish which did not require painting for decorative purposes and with cavity pressures, measured in fourteen separate locations, some examples below:

top of the B-pillar (gate 2) 4,000 psi top of the C-pillar (gate 1) 5,000 psi inner floor pan (B-pillar) 5,000 psi inner floor pan (C-pillar) 2,800 psi bottom of the B-pillar (gate 5) 2,200 psi edge of the floor pan (B-pillar) 3,500 psi edge of the floor pan (C-pillar) 3,500 psi The inner part employed 20 gas entry locations (nozzles), delay time and hold time of the gas to each nozzle allowing the use of all nozzles simultaneously and/or sequentially. Cycle time was as low as 120 sec. and as high as 200 sec.

In another example, a Montell polyolefin, Hivalloy 066, was injection molded using a process and apparatus according to the invention to make frame parts of the nature illustrated in FIGS. 7 and 8 using a sequencing process of gates 1,2,3 on simultaneously then 4,5,6 on simultaneously. The Hivalloy 066 material is a 35 percent glass-filled polypropylene/polystyrene alloy. It was molded at a temperature in the range of 400° F. to 460° F., with mold temperatures in the range of 100° F. and at a pressure in the ranges shown below:

top of the B-pillar (gate 2) 3,700 psi top of the C-pillar (gate 1) 3,700 psi inner floor pan (B-pillar) 3,000 psi inner floor pan (C-pillar) 2,700 psi
bottom of the B-pillar (gate 5) 3,000 psi
edge of the floor pan (B-pillar) 2,100 psi
edge of the floor pan (C-pillar) 2,000 psi When the parts were run conventional, using all gates in the open position and injecting no gas (although the parts did already contain the gas channels used for flow), the parts thus molded were impossible to fill completely, were warped, exhibited burns at the weld lines, and caused the mold to open during the process due to excessive mold pressures in a range of 7,500 psi to 15,000 psi.

With the invention, very large structural articles can be manufactured with a very clear surface finish. The clear surface can be used as external automotive parts, for example, which need not be painted. The surface is clear enough to provide a good decorative surface finish without painting or other cosmetic work.

The parts made according to the invention can be very complex, have numerous curves and corners, using multiple ribs and multiple drops and gas-injection ports. Each of the ribs can have one or more drops for injection of thermoplastic materials, each of which is typically accompanied by a gas-injection port. The gating sequence is determined to control the flow of thermoplastic material away from a first injection port sequentially to the ends of the mold cavity without interfacing of flow of thermoplastic resin from multiple drops. Parts measuring a length in excess of four feet, preferably in excess of five feet, can be made according to the invention.

The invention thus minimizes material usage, strengthens the molded articles through the integral ribs and provides a surface which has a high quality finish. Tonnage is minimized due to the sequential gating and gas-injection process. Further, windows, doors and other openings can be integrally molded into the article without a secondary operation. Structural supports are integrally formed and the weight of the structural supports is minimized with the gas channel. Further, the number of drops needed to mold large articles of this type can be reduced with the use of sequential gating and gas injection.

Reasonable variation and modification are possible within the scope of the foregoing disclosure and drawings without departing from the spirit of the invention which is defined in the accompanying claims.

What is claimed is:

1. An apparatus for molding a relatively large article comprising:
    first and second mold halves defining a mold cavity therebetween in a shape of an article to be produced when the mold halves are clamped together in a closed relationship at a selected clamping pressure;
    first injection conduit in one of the mold halves for injecting molten thermoplastic resin into the mold cavity at a first location;
    a first gate valve connected to the first injection conduit for controlling the flow of thermoplastic resin through the first injection conduit to the mold cavity;
    a second injection conduit in one of the mold cavities for injecting molten thermoplastic resin into the mold cavity at a second location spaced from the first location;
    a second gate valve connected to the second injection conduit for controlling the flow of thermoplastic resin through the second injection conduit to the mold cavity;
    a sensor in the mold to sense the arrival of the molten thermoplastic resin at the second location;
    a controller connected to the first and second gate valves for controlling the opening and closing of the first and second gate valves, the controller being programmed to open the first gate valve and to close the second gate valve during an initial period of time in which molten thermoplastic resin is injected under pressure into the mold cavity through the first injection conduit and to open the second gate valve substantially simultaneously with the arrival of the molten thermoplastic resin at the second injection conduit from the first injection conduit in response to the sensed arrival of the thermoplastic resin at the second location and to thereafter close the first gate valve to terminate the flow of molten thermoplastic resin into the mold cavity from the first injection conduit all while the mold halves are maintained in the closed relationship at least at the selected claiming pressure;
    a gas-injection conduit with a gas control valve and connected to a mold cavity for injecting an inert gas under pressure into the mold cavity to force the molten thermoplastic resin to the edges of the mold cavity; and
    the controller is connected to the gas control valve and is further programmed to open the gas control valve to inject inert gas under pressure into the mold cavity at a time interval after the first gate valve is closed and while the mold halves are maintained in the closed relationship at least at the selected clamping pressure.

2. An apparatus for molding a relatively large article according to claim 1 wherein the controller is programmed to close the first gate valve to discontinue the flow of molten thermoplastic resin to the first injection conduit at about the time the second gate valve is opened.

3. An apparatus for molding a relatively large article according to claim 2 wherein the controller is further programmed to open the gas control valve about the time that the second gate valve is closed.

4. An apparatus for molding a relatively large article according to claim 3 wherein the mold cavity has a rib cavity and the gas-injection conduit is connected to the rib cavity.

5. An apparatus for molding a relatively large article according to claim 4 and further comprising a third injection conduit in one of the mold cavities for injecting molten thermoplastic resin into the mold cavity at a third location spaced from the first and second locations for injecting molten thermoplastic resin into the mold cavity at the third location;
    a third gate valve is connected to the third injection conduit for controlling the flow of thermoplastic resin through the third injection conduit to the mold cavity; and
    the controller is further connected to the third gate valve for controlling the opening and closing of the third gate valve, the controller being programmed to open the third gate valve and to close the second gate valve substantially simultaneously with the arrival of the molten thermoplastic resin at the third injection conduit from the first or second injection conduits and to thereafter close the second gate valve to terminate the flow of molten thermoplastic resin into the mold cavity from the second injection conduit.

6. An apparatus for molding a relatively large article according to claim 5 wherein the controller is programmed to close the second gate valve to terminate the flow of molten thermoplastic resin into the second injection conduit at about the time the third gate valve is opened to inject molten thermoplastic resin into the mold cavity through the third injection conduit.

7. An apparatus for molding a relatively large article according to claim 6 wherein the first gas injection conduit communicates with an area of the mold cavity in the vicinity of the first injection conduit and further comprising:

a second gas injection conduit with a second gas control valve communicating with the mold cavity in the vicinity of the second injection conduit for injecting an inert gas under pressure into the mold cavity in the vicinity of the second injection conduit to assist in the distribution of molten thermoplastic resin to the edges of the mold cavity.

8. An apparatus for molding a relatively large article according to claim 7 wherein the controller is programmed to open the second gas control valve to inject inert gas under pressure into the mold cavity in the vicinity of the second injection conduit about the time the third gate valve is closed.

9. An apparatus for molding a relatively large article according to claim 8 and further comprising:

a third gas injection conduit with a third gas control valve and communicating with the mold cavity in the vicinity of the third injection conduit for injecting an inert gas under pressure into the mold cavity in the vicinity of the third injection conduit to assist in the distribution of molten thermoplastic resin to the edges of the mold cavity;

the controller is programmed to close the third gate valve to discontinue the flow of molten thermoplastic resin to the third injection conduit; and the controller is further programmed to open the third gas control valve to inject an inert gas under pressure into the mold cavity in the vicinity of the third injection conduit.

10. An apparatus for molding a relatively large article according to claim 9 wherein the controller is programmed to open the third gas control valve about the time the third gate valve is closed.

11. An apparatus for molding a relatively large article according to claim 1 wherein the controller is further programmed to open the gas control valve about the time that the second gate valve is closed.

12. An apparatus for molding a relatively large article according to claim 1 wherein the mold cavity has a rib cavity and the gas-injection conduit communicates with the rib cavity to inject gas under pressure into the rib cavity.

13. An apparatus for molding a relatively large article according to claim 12 wherein the first and second injection conduits terminate in the rib cavity whereby molten thermoplastic resin can be injected into the rib cavity.

14. An apparatus for molding a relatively large article according to claim 1 and further comprising a third injection conduit in one of the molten thermoplastic resin into the mold cavity at a third location spaced from the first and second locations for injecting molten thermoplastic resin into the mold cavity at the third location;

a third gate valve is connected to the third injection conduit for controlling the flow of thermoplastic resin through the third injection conduit to the mold cavity;

a sensor in the mold to sense the arrival of the molten thermoplastic resin at the third location; and the controller is further connected to the third gate valve for controlling the opening and closing of the third gate valve, the controller being programmed to open the third gate valve and to close the second gate valve substantially simultaneously with the arrival of the molten thermoplastic resin at the third injection conduit from the first or second injection conduits in response to the sensed arrival of the thermoplastic resin at the third location and to thereafter close the second gate valve to terminate the flow of molten thermoplastic resin into the mold cavity from the second injection conduit.

15. An apparatus for molding a relatively large article according to claim 1 wherein the sensor is a pressure sensor.

16. An apparatus for molding a relatively large article according to claim 1 wherein the mold cavity has at least one dimension of at least four feet.

17. An apparatus for molding a relatively large article according to claim 16 wherein the mold cavity has at least a second dimension in excess of four feet.

* * * * *

UNITED STATES PATENT AND TRADEMARK OFFICE
CERTIFICATE OF CORRECTION

PATENT NO. : 6,227,840 B1
DATED : May 8, 2001
INVENTOR(S) : Keller et al.

It is certified that error appears in the above-identified patent and that said Letters Patent is hereby corrected as shown below:

Column 14, claim 1,
Line 17, "claiming" should read -- clamping --

Column 16, claim 14,
Line 11, "conduit in one of the molten" should read -- conduit in one of the mold cavities for injecting molten --

Signed and Sealed this

Thirteenth Day of November, 2001

Attest:

NICHOLAS P. GODICI
Attesting Officer
Acting Director of the United States Patent and Trademark Office